United States Patent [19]
Nicolas et al.

[11] 3,911,743
[45] Oct. 14, 1975

[54] FLOW METER APPARATUS

[75] Inventors: Yves Nicolas, Versailles; Andre Landaud, Maisons Alfort, both of France

[73] Assignee: Schlumberger Technology Corporation, New York, N.Y.

[22] Filed: Feb. 8, 1974

[21] Appl. No.: 440,734

[30] Foreign Application Priority Data
Feb. 9, 1973  France .............................. 73.04669

[52] U.S. Cl. ................ 73/229; 73/155; 308/DIG. 4
[51] Int. Cl.² ......................................... G01F 15/00
[58] Field of Search ...... 73/155, 229, 231; 308/159, 308/DIG. 4

[56] References Cited
UNITED STATES PATENTS

| | | | |
|---|---|---|---|
| 1,173,369 | 2/1916 | Moore | 308/DIG. 4 |
| 1,557,767 | 10/1925 | Oliver | 308/DIG. 4 |
| 3,026,155 | 3/1962 | Loretan | 308/159 |
| 3,162,042 | 12/1964 | Hart | 73/155 |
| 3,371,531 | 3/1968 | Ezekiel et al. | 73/231 R |
| 3,630,078 | 12/1971 | Bonnet | 73/155 |
| 3,811,323 | 5/1974 | Swenson | 73/231 R |

FOREIGN PATENTS OR APPLICATIONS

| | | | |
|---|---|---|---|
| 964,621 | 2/1950 | France | 308/DIG. 4 |
| 930,283 | 7/1963 | United Kingdom | 308/DIG. 4 |

*Primary Examiner*—Charles A. Ruehl
*Attorney, Agent, or Firm*—Ernest R. Archambeau, Jr.; William R. Sherman; Stewart F. Moore

[57] ABSTRACT

An arrangement for minimizing and damping vibrations of a flow meter rotor. A loose fitting ring is mounted between a surface of the rotor and a surface of the flow meter body, the ring having sufficient clearance to rotate with respect to both the rotor and the body. The ring is normally stationary with respect to one of the surfaces, depending on whether the ring is mounted on the support or on the rotor, and is moved transversely in response to radial displacement of the rotor so the ring rotate can engage and with respect to both surfaces. Braking of the rotor during shaft vibration is minimized by the ring, and the ring does not sustain rotor vibration. The arrangement can be used in a centering bearing between the ends of the rotor as well as in a pivot bearing.

22 Claims, 11 Drawing Figures

FLOW METER APPARATUS

This invention relates to rotary flow meters of improved accuracy and to improved shaft damping arrangements particularly useful in well bore flow meters.

At present, rotary flow meters such as turbine type and screw type flow meters are widely used to measure flow of various fluids including abrasive fluids such as well bore fluids. Where the fluid flow rate changes slowly in a relatively narrow range, excellent accuracy can be obtained with known rotary flow meters. However, where the flow meter measures a wide range of fluid flow rates, inaccuracies occur especially where there are fluctuations in the fluid flow rate.

It has been found that rotary flow meters used under these conditions exhibit a non-repeatability effect such that the speed of rotation of the flow meter rotor is different, for the same flow rate, when the flow is increasing, decreasing, or fluctuating. For example, it has been found that for the same flow rate and for the same fluids, it is possible to obtain data to plot a first response curve of rotor speed as a function of flow rate, by slowing and gradually increasing the flow rate from a zero value, and to obtain data which results in a second response curve parallel to the first curve by suddenly reducing the flow rate and then slowly increasing the flow rate. The first response curve can be obtained again by decreasing the flow to a very low value, and then gradually increasing the flow. Since the flow rate is determined by measuring the speed of rotation, or the number of revolutions of the rotor, the measured flow rates are frequently erroneous, even if the meter is initially carefully calibrated. Errors in measured flow can be as high as 20%.

In screw or turbine type flow meters of the conventional type the rotor is usually mounted on plain bearings. Since the bearings are immersed in fluids which are often abrasive, it is generally not possible to use ball bearings because ball bearings must be contained in fluid tight casings. In these flow meters, the previously mentioned intermittent vibrations, which very often occur, brake the rotor. This phenomenon can be easily observed, for example, by driving the rotor with air directed toward the screw. Under certain conditions, and particularly at high flow, the screw vibrates at audible frequencies. If the air flow is interrupted, while the screw is vibrating, the screw stops rotating much more quickly then in the absence of such vibrations.

It has been found that such vibrations frequently occur when the flow meter is actually in use to measure the flow of fluids such as well bore fluids. It has also been found that the rotor speed errors coincide with the appearance of these vibrations. It is, however, impossible to correct or calibrate the meter because neither the extent of nor the instant of appearance of these vibrations can be predicted. An additional adverse effect of such vibrations is rapid wear of the bearings.

Correspondingly, in order to obtain a flow meter which is accurate under varying and/or fluctuating flow rates, it is necessary to eliminate or at least minimize the effects of these rotor vibrations.

In an effort to maintain friction between the rotor and its bearings at a minimum, hard material pivot and crown bearings are frequently used especially where the fluid to be measured by the flow meter is abrasive. In addition, olived ring bearings formed from the very hard material corundum, are used as bearings for the rotor. Where the rotor shaft is long, centering bearings are frequently used, which can take the form of a ring or bushing of corundum which is either fixed to the rotor shaft so it rotates with the rotor shaft in opposed relation to a surface of the rotor support, or is fixed to the body in which the rotor shaft rotates.

When the flow meter is subjected to a flow condition which causes the rotor to vibrate, the rotational axis of the shaft is displaced transversely. This causes the shaft to precess, and the force exerted on the bearings in a radial direction increases, or in the case of a centering bearing, the shaft engages the bearing. It is believed that this radial force coupled with the precession of the rotor causes the bearings to sustain the rotor vibration as a result of tangent friction between the shaft and the bearings. Considering the rotor to be stationary, with the bushing of the bearing rotating around the rotor shaft, it appears that the bushing behaves, with respect to the rotor, like a violin bow moving over a string.

One possible approach to the solution of this problem would be to maintain the bearings well lubricated. This is difficult with flow meter bearings since these bearings are immersed in the flowing fluids. Lubricating centralizing bearings is virtually impossible.

Another possible approach to the problem would be to minimize the clearance or play between the rotor shaft and the bearing. However, since the wear of flow meter bearings is usually high, the clearance very quickly increases and vibrations appear again. Correspondingly, a very small clearance can be maintained only by replacing the bearings very frequently. In the case of centralizing bearings used, for example, with magnetic suspension systems for the flow meter rotor, the clearance between the bearing and the shaft is usually large initially, and the extent of the clearance has minimal effect on the tendency of the shaft to vibrate.

Correspondingly, in view of the above discussion, it is apparent that there is a need for a flow meter in which rotor vibrations are eliminated or at least minimized, to enhance the accuracy of the flow meter.

It is an object of this invention to provide an improved bearing arrangement which provides a simple and unique solution to the problem of minimizing shaft vibration.

It is another object of this invention to provide an improved arrangement for minimizing vibration of a flow meter rotor.

Another object of the invention is to provide a unique bearing arrangement for supporting and centering the rotor of a flow meter which does not sustain vibration of the rotor and which dampens rotor vibration.

In accordance with the objects and aspect of the invention, a ring of revolution is disposed between a surface of a shaft and a surface carried by the support or body on which the shaft rotates, the ring being rotatable with respect to both the shaft and the surface of the body.

In accordance with another aspect of the invention, a bearing is provided which includes a pivot and a collar arranged around the pivot, the collar having a cavity presenting a surface of greater diameter than the pivot, and a ring of revolution in the cavity, surrounding the pivot, and rotatable with respect to both the pivot and the collar.

In accordance with another aspect of the invention, a long shaft rotor which can be magnetically supported for rotation is provided with one or more centering bearings in the form of a ring mounted on the flow meter body between the shaft and the body, the ring or rings being rotatable with respect to both the shaft and the body.

According to another aspect of the invention a centering bearing includes a loose fitting ring between the rotor shaft and the body in which the shaft rotates so the ring can rotate with respect to both the shaft and the body, in the environment of a flow meter where the rotor is magnetically supported.

In accordance with another aspect of the invention, the flow meter is of the type having a folding screw, the rotor shaft is elongated, and one or more centering bearings including loose fitting rings between the rotor shaft and the flow meter body are arranged to rotate with respect to both the rotor and the body.

Numerous other objects, features, and advantages of this invention will be apparent with reference to the following detailed description and to the drawings.

DESCRIPTION OF PREFERRED EMBODIMENTS

Figure 1:
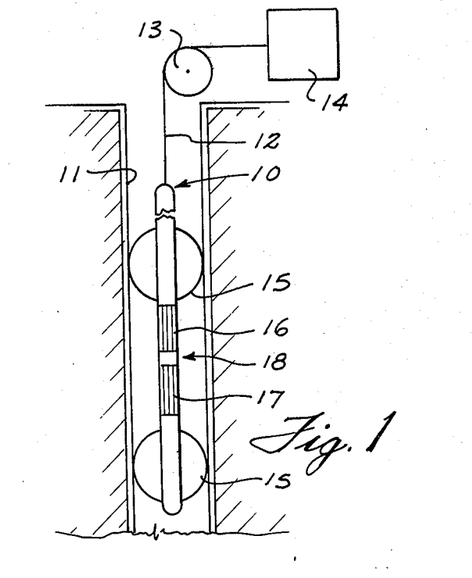
FIG. 1 is an overall view of one flow meter apparatus, according to the invention, and shown in a well borehole.

Referring to FIG. 1, a probe 10 which can be of the type disclosed in French Pat. No. 2,036,200, published Dec. 14, 1970, is suspended in a well bore 11 by an armored cable 12, containing a single, insulated conductor or multiple conductors if desired. The cable 12 passes over a pulley 13 and is connected to surface equipment 14 which serves to roll and unroll cable 12 in a conventional manner to raise or lower the probe, to process and record the signals coming from the probe, and to indicate flow rates from a flow meter in the probe.

The probe 10 can be a packerless type which has centralizers 15 that maintain the probe centered in the well bore 11. The probe 10 has upper and lower orifices 16 and 17, respectively, opening to the upper and lower ends of a passageway extending longitudinally through the probe. Intermediate the orifices is a flowmeter assembly 18 which measures the flow of well fluids through probe 10.

Figure 2:
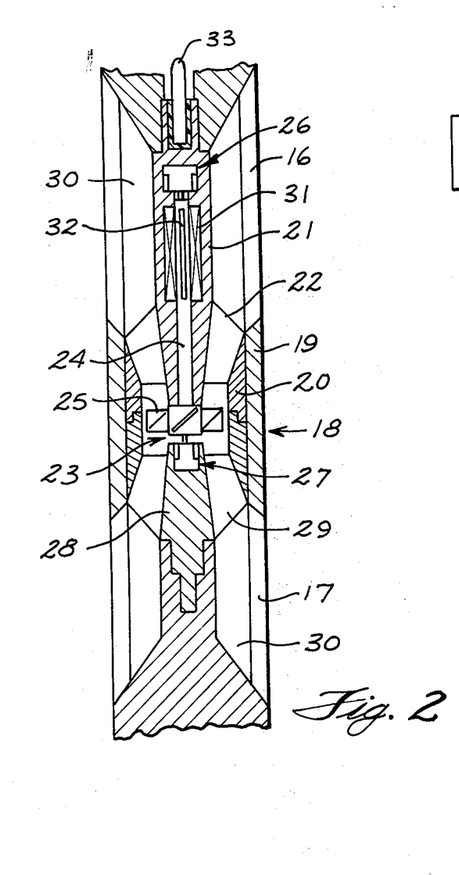
FIG. 2 is an enlarged longitudinal cross section of a portion of the apparatus of FIG. 1.

Referring to FIG. 2, the flow meter assembly 18 is illustrated in a section of the probe 10. The passage way through probe 10 intermediate the orifices 16 and 17 is formed by the interior of a tubular section 20 within a body 19 of the probe. The flow meter assembly 18 includes an upper housing 21 centrally secured within the section 20 by three or more radially extending combined guide vane and support members 22 which form a spider-like support for housing 21.

A rotor assembly 23 includes a shaft 24 and a spinner or screw 25 secured to the shaft to rotate the shaft. Shaft 24 extends into upper housing 21 and is supported for rotation on a vertical axis by bearing assemblies 26 and 27 at its opposite ends, when probe 10 is in the upright working position shown at FIG. 1. The lower bearing assembly 27 is mounted in a lower housing 28 secured to tubular section 20 by combined guide vane and support members 29 which form a spider like support. Guide vanes 30 on body 19 well bore fluids toward tubular section 20.

A sensing coil 31 is mounted in housing 21 in opposed relation to a radially magnetized magnet 32 in shaft 24. The coil 31 is connected to an electrical connector 33 which in turn connects to cable 12 so the frequency of current induced in coil 31 as a result of rotation of magnet 32, is transmitted to the surface equipment 14. The frequency of the current induced in coil 31 is indictive of the speed of rotation of rotor assembly 23.

Figure 3:
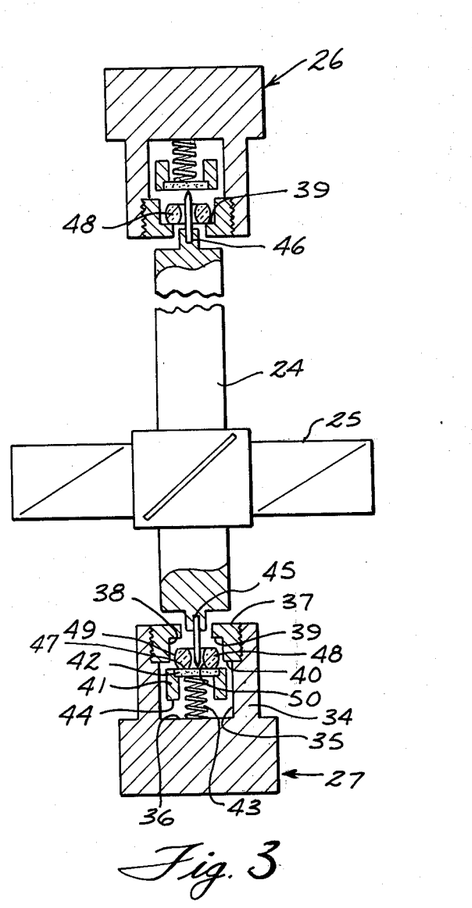
FIG. 3 is a fragmentary enlarged view in longitudinal section of a portion of the apparatus of FIG. 2.

FIG. 3 shows the bearing arrangement for the rotor assembly 23 in greater detail. As shown at FIG. 3, lower bearing assembly 27 includes a cylindrical support 34 in which a cylindrical cavity 35 having a flat inner end 36 is formed. The open end of cavity 36 is threaded to receive a collar 37 which has a bore 38 opening toward inner end 36 and terminating at a transverse annular shoulder 39 which faces toward inner end 36. Bore 38 of collar 37 is advantageously a highly polished internal surfaces of revolution which can be cylindrical. A bottom edge 40 of collar 37 limits the depth that the collar can be threaded into support 35. Mounted in cavity 35 for axial movement is a sleeve 41 having one end open, and a hard material disc 42 fitted into its other end. Disc 42 has a flat polished surface which faces toward rotor shaft 24 and is secured to sleeve 41. A spring 43 within sleeve 41, seats on inner end 36 of the cavity 35 and urges the sleeve and disc toward collar 37. Sleeve 41 has a diameter greater than the diameter of bore 38 in collar 37 so movement of the sleeve away from inner end 36 is limited by the bottom face 40 of the collar. An end face 44 of sleeve 41 limits its movement in a direction toward inner end 36 of cavity 35. A pivot 45 is embedded in and secured to the lower end of shaft 24, and a pivot 46 is embedded in and secured to the upper end of shaft 24. Each pivot has a pointed tip and is formed from a very hard material such as tungsten carbide. Pivot 45 extends into bore 38 and engages the polished support surface 47 of disc 42. In the annular space between pivot 45 and the wall of bore 38 is a ring 48 which is generally concentric with the axis of rotation with shaft 24. Ring 48 is formed from a hard material such as corundum, and can be ruby or sapphire. The radial thickness of the ring is such that its outside diameter is slightly less than the diameter of bore 38, and its inside diameter is slightly greater than the diameter of pivot 45. The height of ring 48 as measured axially, is somewhat less than the distance between shoulder 39 and bottom edge 40 of collar 37 so the ring can move axially within the limits of shoulder 39 and surface 47 of the disc. This relative dimensioning of the ring with respect to the collar and pivot enables the pivot to rotate with respect to the ring, and the ring to rotate with respect to the bore 38 of collar 37. To illustrate the extent of the clearances involved, where a pivot 45 had a diameter of about one millimeter, the play or clearance between pivot 45 and the inside surface of ring 48, and between the outside surface of the ring and the bore 38 of collar 20, were each on the order of a few hundredths of a millimeter.

The polished support surface 47 of disc 42 provides a smooth bearing surface on which ring 48 can rotate in the event that the ring is engaged by the pivot as a result of radial displacement of the axis of shaft 24.

Upper bearing 26 can be identical to lower bearing 27. In the case of the upper bearing, however, transverse annular shoulder 39 is polished to provide a surface on which the ring 48 can rotate in the event that the upper end of shaft 24 is displaced radially so it engages the ring. Each ring 48 is so dimensioned with respect to its pivot, that the pivot engages the ring, in the event of radial displacement of shaft 24, and the shaft never engages the opening through the outer end of collar 37 during normal operation of the flow meter 18.

As shown at FIG. 3, the inner and outer surfaces 49 and 50 of ring 48 are each convex so there is only a small area of contact when cylindrical pivot 45 engages the inside of the ring and when cylindrical bore 38 is engaged by the ring. The hard material discs 42 which can be ruby, engage the ends of the respective pivots 45 and 46 to provide a low friction bearing arrangement which permits rotor assembly 23 to rotate, and to move axially as a result of the action of springs 43. With regard to bearing assembly 27, during normal rotation of shaft 24 there are no transverse or radially forces acting on the shaft and the pivot 45 only lightly engages the internal surface of the ring 48. The pivot rotates with respect to the ring which remains stationary because the friction moment applied to the larger diameter outer surface of each ring by the bore 38 of the collar holds the ring against rotation. Should the lower end of the shaft begin to vibrate as a result of the flow of fluids through the flow meter assembly, the effect of such vibration is to periodically displace the rotating pivot transversely against the inside of ring 48. As a result of the vibrations, shaft 24 and pivot 45 can also precess. If ring 48 were fixed, the rotating and vibrating pivot would rub on the inside of the ring, thereby braking the rotor intermittently and sustaining the rotor vibration. It is this sustaining of the rotor vibrations by the bearings which is believed to be responsible for the inaccuracies in prior meters, since the vibration is caused to continue after the initial cause of the vibration disappears.

Where the ring 48 is rotatable with respect to both the pivot 45 and bore 38 of collar 37, the rotating and vibrating pivot engages the ring and causes the ring to rotate, with the result that there is no significant braking of the rotor and there no significant rubbing of the pivot on the ring. Even if the ring is rotated by the pivot for sometime, there is only a slight reduction in speed of the shaft, due primarily to the increase in the inertia of the rotating assembly including the ring. Correspondingly, vibrations of the shaft are not sustained by the bearing. Even if the ring 48, pivot 45, and bore 38 wear substantially so the plays or clearances originally on the order of a few hundredths of a millimeter increase to a few tenths of millimeter, the bearings do not sustain the rotor vibration. In the event that the upper end of the shaft 24 should vibrate, the ring in upper bearing 26 operates in the same manner to prevent the bearing from sustaining the shaft vibration.

Figure 4:
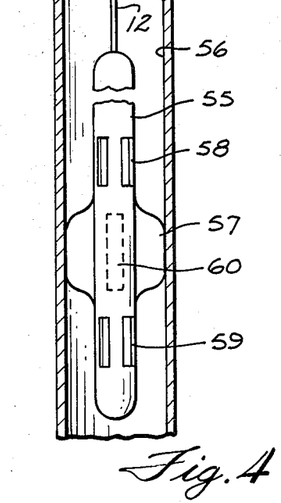
FIG. 4 is an overall view of a second embodiment of flow meter apparatus, according to the invention, and shown in a well borehole.

FIG. 4 shows a probe of the type disclosed in U.S. Pat. No. 3,162,042 issued Dec. 22, 1964. A probe 55 is suspended in a well bore 56 by a cable 12 connected to surface equipment which can be the same as that shown in FIG. 1. Probe 55 can have a packer 57, or can be of the packerless type. The probe has upper and lower orifices 58 and 59 opening to the upper and lower ends of a passageway extending longitudinally through the probe. Intermediate the orifices is a flow meter assembly 60.

Figure 5:
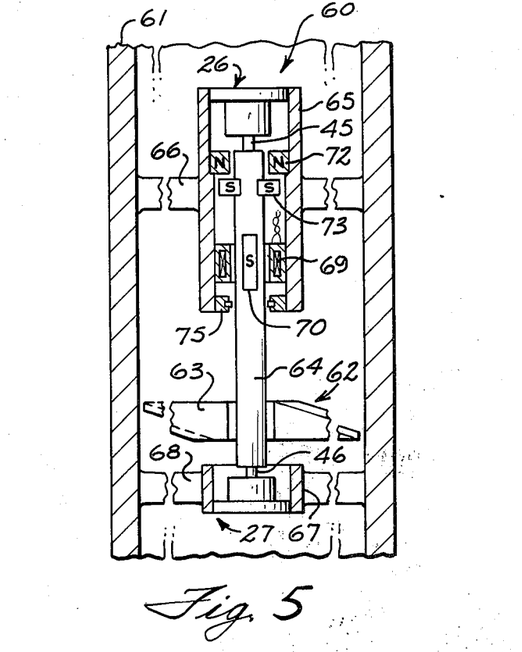
FIG. 5 is an enlarged longitudinal section of a portion of the flow meter of FIG. 4.

FIG. 5 shows the flow meter assembly 60 of the probe 55. The passageway through probe 55 intermediate the orifices 58 and 59 is formed by the interior of a tubular section 61 of the probe. A rotor assembly 62 includes a screw 63 secured to a shaft 64 for rotation with the shaft. One end of the shaft extends into a housing 65 which is supported by radially extending support members 66 to form a spider like support. There is also a lower housing 67 supported by the spider like support members 68.

Within housing 65 is a sensing coil 69 surrounding a portion of shaft 64 which has a radially magnetized magnet 70, the magnet inducing current of a frequency indictive of the speed of rotation of rotor 62 in coil 69, which is connected to the surface equipment by cable 12.

At the opposite ends of shaft 64 are pivots 45 and 46 identical to those described in the embodiment of FIGS. 1-3. These pivots are mounted in bearing assemblies 26 and 27, also identical to the bearing assemblies previously described. An additional feature of the embodiment of FIGS. 4 and 5 is the magnetic suspension provided by ring shaped magnet 72 secured to housing 65 immediately above a ring shaped magnet 73 secured to shaft 64. Magnets 72 and 73 cooperate with each other in the manner described in U.S. Pat. No. 3,162,042 to magnetically support shaft 64 axially, so only a small portion of the weight of the rotor assembly is supported by lower bearing 27. A second feature of the embodiment of FIG. 5 is the centering bearing arrangement where shaft 64 enters housing 65, and which is shown in greater detail at FIG. 6.

Figure 6:
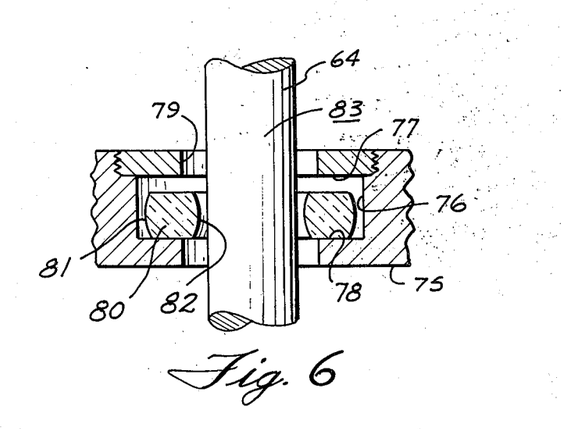
FIG. 6 is an enlarged fragmentary view in longitudinal section of a portion of the apparatus of FIG. 5.

The flange 75 where shaft 64 enters housing 65 has an internal annular recess defined by an inner cylindrical surface 76 terminating at spaced apart transverse annular shoulders 77 and 78 which face each other and are parallel. The bore 79 through flange 75 has a diameter somewhat greater than the diameter of shaft 64. A ring 80 extends around shaft 64 and seats on shoulder 78 of the recess when the flow meter is in the working position shown at FIG. 4. The outside surface 81 of ring 80 has a diameter slightly less than the diameter of inner cylindrical surface 76, and the inside surface 82 of the ring has a diameter slightly greater than the diameter of the cylindrical shaft 64 where it passes through the ring. Ring 80 has a height less than the distance between shoulders 77 and 78, so the ring can move axially, but the extent of this axial movement is limited by the respective shoulders. The outer surface 81 of the ring can be convex and the inner surface 82 of the ring can also be convex to maintain friction between the ring and shaft and the ring and recess at a minimum. The surface 83 of the shaft, in the region of ring 80 can be hardened, for example, by case hardening, or a hard material sleeve (not shown) can be fitted to the shaft, if desired. Ring 80 is formed from a very hard material such as ruby or sapphire.

The function of ring 80 is essentially the same as that of ring 48 in that it operates to keep shaft 64 centered and to minimize vibration of the shaft. During normal rotation of shaft 64, when the shaft is not vibrating, the surface 83 of the shaft may lightly engage the inside surface 82 of the ring, and under some conditions may not engage the inside of the ring at all. During such normal rotation of the shaft, ring 80 does not rotate. When shaft 64 vibrates, the transverse displacement of the shaft caused by the vibration moves the surface 83 of the shaft into engagement with inside surface 82 of the ring and displaces the ring so its outside surface 81 engages inner cylindrical surface 76. Because of the clearances between the ring and shaft, and between the cylindrical surface and ring, the ring can rotate, and tends to maintain the shaft centered. As a result of the radial displacement of the shaft, the ring is rotated by the shaft and there is no rubbing engagement to sustain vibrations, which sustained vibrations could occur if the ring were not free to rotate with respect to both the shaft and the flange.

By virtue of the centering bearing including the ring 80, which can engage the shaft at a location between the bearings 26 and 27, which each include the ring 48, substantial damping of shaft vibrations also occurs.

Figure 7:
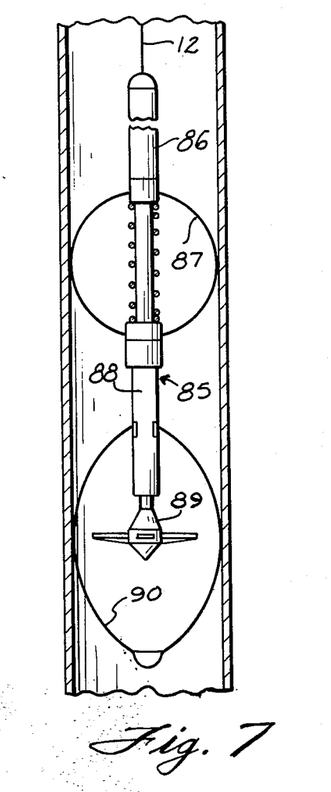
FIG. 7 is an overall view of another embodiment of flow meter apparatus, according to the invention, and shown in a well bore.

FIG. 7 shows a probe 85 of the type described in U.S. Pat. No. 3,630,078, issued Dec. 28, 1971. The probe 85 has an upper section 86, an upper centering device 87 including bow springs, a hydraulic and mechanical section 88, a folding blade propeller or screw 89 and a protective centering device 90 around screw 89. The probe 85 is connected to surface equipment such as that shown in FIG. 1 by a cable 12. Probe 85 can measure higher flow rates than previously described flowmeters.

Figure 8:
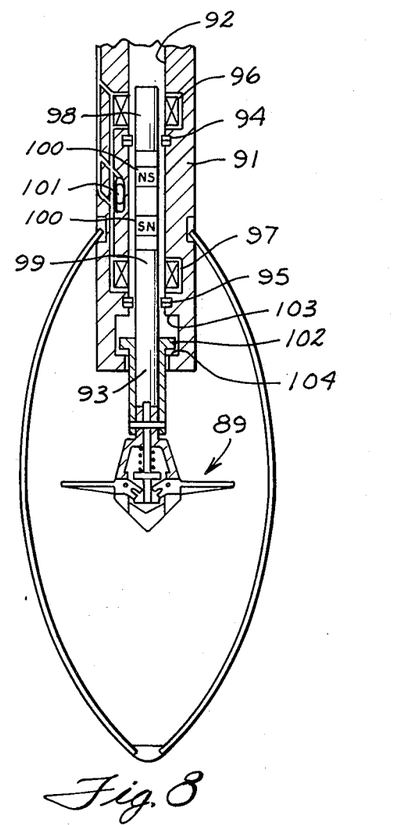
FIG. 8 is a view in longitudinal section of a lower portion of the flow meter of FIG. 7.

FIG. 8 shows in greater detail, the lower portion of probe 85, below the hydraulic and mechanical section 88. As shown in FIG. 8, the lower part of the probe has a body 91 with a central bore 92 opening toward the bottom and in which is mounted a shaft 93 holding the folding blade propeller or screw 89. The inside of bore 92 is equipped with two centering bearing assemblies 94 and 95 surrounding the shaft 93, with considerable clearance. Bearing assemblies 94 and 95 are spaced apart a considerable distance longitudinally. Two magnetic suspension coils 96 and 97 are within the body and longitudinally separated from each other. The shaft 93 has several cylindrical sections secured together and of different material. Two upper and lower sections 98 and 99 located respectively opposite coils 96 and 97 are made of ferro-magnetic metal so that their centers are below the center horizontal plane of each coil. Each of these sections is thus subjected to an upward force when coils 96 and 97 are energized to magnetically suspend shaft 93 for rotation. In the portion of the shaft between the ferro-magnetic sections 98 and 99 are magnets 100 which cooperate with a reed switch 101 to open and close the contacts of the switch, the pulses produced by the reed switch being transmitted to the surface equipment by cable 12 to indicate the flow rate measured by the flow meter. The manner of folding and unfolding the blades of screw 89, the action of the magnetic suspension, and the rotation detecting arrangement are fully explained in U.S. Pat. No. 3,630,078.

With electromagnets 95 and 96 energized, the rotor assembly is suspended in the position shown at FIG. 8 where the lip 102 is spaced between shoulders 103 and 104. The coils 96 and 97 are energized with an alternating current so as to give shaft 93 a back and forth complex vertical movement which provides for lowering the rotation threshold of the rotor assembly. This enables obtaining accurate flow measurements at very low flow rates.

Figure 9:
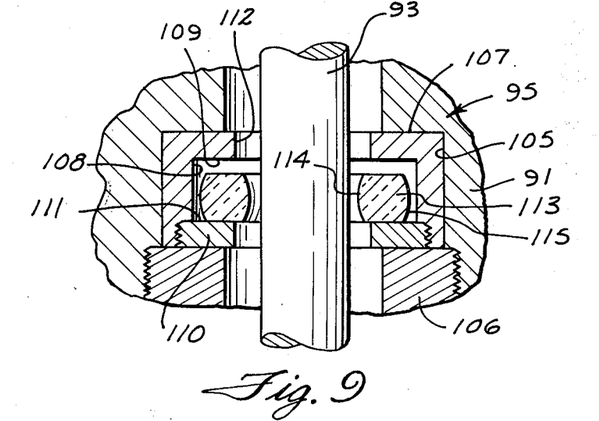
FIG. 9 is an enlarged fragmentary view in longitudinal section of a portion of the apparatus of FIG. 8.

The centering bearing 95 which maintains shaft 93 centered in bore 92 is shown in greater detail at FIG. 9. As shown at FIG. 9, bearing assembly 95 is positioned in a recess 105 of body 91 and is held in place by a thread sleeve 106. The bearing assembly includes a collar 107 with a polished cylindrical bore 108 that terminates at a flat transverse annular shoulder 109. A flange 110 threaded into the bottom of collar 107 presents a transverse annular surface 111 which faces toward surface 109. The collar and flange have a central bore 112 to receive shaft 93 and which provides substantial clearance between the surface of the shaft and the bore.

Surrounding the shaft and disposed in collar 107 is a hard material ring 113 which can be ruby or sapphire. The inside surface 114 of the ring has a diameter somewhat less than bore 112 and an outside surface 115 is smaller than the diameter of bore 108. The radial thickness of the ring is somewhat greater than the difference in radius of bore 108 and bore 112 so shaft 93 can engage surface 114 of the ring but cannot engage bore 112 when the shaft is displaced radially.

Ring 113 functions to maintain shaft 93 centered and to dampen and minimize vibration of the shaft. In the event that shaft 93 vibrates, the shaft will engage inside surface 114 of the ring and move the ring toward bore 108, which will cause the ring to rotate. This rotation of the ring prevents the bearing from sustaining vibrations of the shaft, in the manner previously explained, maintains the shaft centered, and dampens vibrations of the shaft. By virtue of the clearances between ring 113 and shaft 93 and bore 108, the ring does not rotate when the shaft rotates normally. However, the ring can rotate with respect to both the shaft 93 and bore 108 in the event of radial displacement of the shaft.

Surfaces 109 and 111 limit the extent of axial movement of the ring with respect to collar 107. As a result of the vertical jittering effect of the magnetic suspension on the shaft, some axial movement of the ring can occur. The low friction characteristics of the ring even further reduce the rotational threshold of the rotor assembly. Bearing assembly 94 can be identical to bearing assembly 95 and operates as explained for bearing assembly 95.

Figures 10, 11:
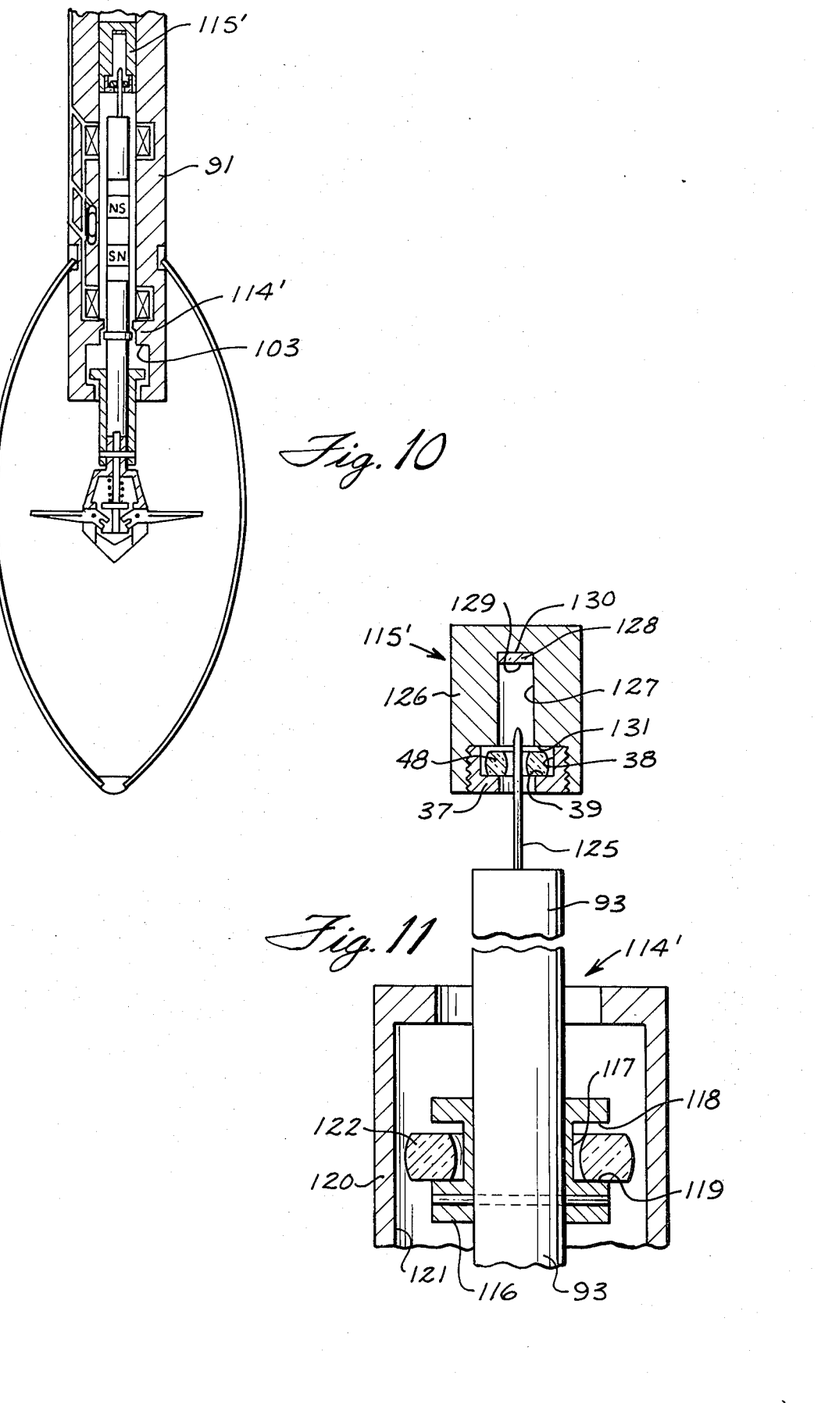
FIG. 10 is a view corresponding to FIG. 8 and showing a bearing arrangement different from the embodiment of FIG. 8.
FIG. 11 is an enlarged fragmentary view in longitudinal section of the bearing arrangement used with the embodiment of FIG. 10.

FIG. 10 shows the probe of FIG. 8 with a different mechanical bearing arrangement. In the embodiment of FIG. 10 there is a lower centering bearing assembly 114' slightly above shoulder 103, and an upper centering bearing assembly 115', above the upper end of the shaft 43, is also provided. Otherwise, the portion of the probe shown at FIG. 10 is the same as FIG. 8.

FIG. 11 shows bearing assemblies 114' and 115' in greater detail. Bearing assembly 114' includes a collar 116 pinned to shaft 93 so it rotates with the shaft. Formed in collar 116 is an annular groove with a polished cylindrical surface 117 and transverse annular faces 118 and 119. Mounted in body 91 is a bushing 120 with an inside surface 121 of a diameter substantially greater than the outside diameter of collar 116. Mounted on collar 116 is a hard ruby or sapphire ring 122, identical in configuration to those previously described. The height of the ring is less than the distance between faces 118 and 119, the inside diameter of the ring is slightly greater than the diameter of cylindrical surface 117, to provide a clearance, and the outside diameter of the ring is somewhat less than the inside diameter of surface 121. This provides a greater clearance between the outside of the ring and the inside of surface 121 then there is between the inside of the ring and cylindrical surface 117 of collar 116.

At the upper end of shaft 93 is an upwardly projecting pivot 125 which is embedded in and secured to the shaft. This pivot forms part of bearing assembly 115'. Bearing assembly 115' is quite similar to bearing assembly 26 of the embodiment of FIG. 3, and includes a ruby ring 48, which rests on a shoulder 39 of a collar 37 threaded into a body 126, which has a cavity 127. A ruby disc 128 with a flat polished surface 129 is fixed to the end 130 of the cavity. At the lower end of cavity 127 is a shoulder 131. The internal surface of bore 38 of collar 37 is a highly polished cylindrical surface, shoulder 39 is highly polished, and shoulder 131 is highly polished. This enables ring 48 to rotate when it is engaged by pivot 25, in the manner described for bearing assemblies 26 and 27. The shoulders 39 and 131 permit some axial movement of the ring, but prevent excessive axial movement.

In the bearing assembly 115', the tip of pivot 125 does not usually engage the disc 128. Only when the flow of fluid upwardly through the well bore is abnormally high, or when some other abnormal condition exists, does the pivot engage the disc. During normal rotation of shaft 93, ring 122 of the centering bearing 114' rotates with shaft 93. Since the clearance between the inside of ring 122 and cylindrical surface 117 of the collar is relatively small, the ring merely rotates with shaft 93, at the same speed as the shaft. In the event that the axis of the shaft is displaced, as can happen when the shaft vibrates, the outside surface of the ring engages cylindrical surface 121 so the ring is braked or decelerated with respect to the shaft. The effect of such braking is far less severe on the rotor than the braking which would occur if ring 122 were fixed to the shaft. Correspondingly, the same phenomenon of damping and preventing sustained vibration of the shaft is realized with the bearing assembly 114'. Pivot 125 and cylindrical surface 121 are each of sufficient axial height that shaft 93 can be moved axially to the several positions necessary to fold and unfold the blades of screw 89 while maintaining the pivot with ring 48, and the ring 122 within the axial extent of surface 121.

While several embodiments of the shaft damping and vibration minimizing arrangement, according to this invention, have been shown and described, it is to be understood that these embodiments are illustrative of the invention, and that changes can be made without departing from the scope of the invention.

What is claimed is:

1. A flow meter comprising, a support, a rotor having an axis and mounted for rotation relative to the support, means for improving the accuracy of the flow meter and comprising, a rigid ring generally concentric with the rotor axis and between a surface of revolution of the rotor and a surface of revolution spaced from the rotor and carried by the support, the ring having a radial thickness less than the space between the surfaces so that the ring is normally out of engagement with the rotor surface and stationary with respect to one of the surfaces, but can move transversely to engage both surfaces and can rotate with respect to both the surfaces, in response to radial displacement of the rotor surface caused by rotor vibration, and wherein the surface of the rotor and the surface of the ring facing the surface of the rotor form a pair of surfaces, the surface carried by the support and the surface of the ring facing the surface carried by the support form another pair of surfaces, and one surface of each of said pair of surfaces is convex.

2. A flow meter according to claim 1 wherein the flow meter includes another means for improving the accuracy of the flow meter like said first mentioned means and spaced axially of the rotor from the first mentioned means.

3. A flow meter according to claim 1 wherein said ring is an annular body of corundum.

4. A flow meter according to claim 1 wherein the other surface of each pair of surfaces is cylindrical.

5. A flow meter according to claim 1 wherein a magnetic support system supports the rotor for rotation relative to the support.

6. A flow meter according to claim 1 wherein the axis of the rotor is vertical, and a surface transverse to the axis of the rotor mounts the ring for rotation and transverse movement relative to the rotor surface and the surface carried by the support.

7. A flow meter according to claim 1 wherein the flow meter further includes, means for limiting movement of the ring in a direction parallel to the axis of the rotor.

8. A flow meter according to claim 7 wherein the means for limiting the movement of the ring in a direction parallel to the axis of the rotor comprises first and second surfaces transverse to the axis of the rotor and spaced apart a distance greater than the thickness of the ring as measured along its axis.

9. A flow meter bearing for rotatably mounting a rotor member on a support member comprising, a pivot fixed to one of the members, a collar fixed to the other of the members, an internal surface of the collar extending around the pivot, and a ring around the pivot and between the pivot and the internal surface, and means mounting the ring for rotation with respect to both the pivot and the internal surface.

10. A flow meter bearing according to claim 9 wherein, the ring has convex inner and outer surfaces, and the pivot and internal surface are each cylindrical.

11. A flow meter bearing according to claim 9 wherein the outer surface of the ring is of a diameter slightly less than the internal surface of the collar, the inner surface of the ring is of a diameter slightly greater than the pivot, so that there is a clearance which permits transverse movement of the ring.

12. A flow meter bearing according to claim 9 wherein the means mounting the ring for rotation comprises a surface transverse to the internal surface of the collar.

13. A flow meter bearing according to claim 12 wherein the transverse surface is a flat surface of a hard material body engaged by the end of the pivot.

14. A flow meter bearing according to claim 13 wherein spring means urge the hard material body into engagement with the end of the pivot.

15. A flow meter bearing according to claim 9 wherein the means mounting the ring comprises a transverse annular surface fixed to the support and having an opening through which the pivot extends, said opening being substantially greater than the diameter of the pivot so the pivot does not engage the sides of the opening.

16. A flow meter bearing according to claim 9 wherein means are provided for mounting the rotor for rotation and include a magnetic support system.

17. A flow meter bearing according to claim 16 wherein the magnetic support system includes an electromagnetic support system for reciprocating the rotor axially to lower the rotation threshold of the rotor.

18. A flow meter bearing according to claim 9 wherein said pivot and collar mount one end of the shaft for rotation, and bearing means mount the shaft for rotation at a location spaced axially from said pivot and collar.

19. A flow meter bearing according to claim 18 wherein said bearing means mount the other end of the shaft for rotation, and include a pivot and collar.

20. A flow meter bearing according to claim 9 wherein said pivot is secured to the shaft and said collar is carried by the support.

21. A flow meter bearing according to claim 9 wherein means are provided for limiting movement of the ring axially.

22. A flow meter comprising, a support, a rotor having an axis and mounted for rotation relative to the support, means for improving the accuracy of the flow meter and comprising, a ring in the form of an annular body of corundum, generally concentric with the rotor axis and between a cylindrical surface of the rotor and a cylindrical surface spaced from the rotor and carried by the support, the ring having a thickness less than the space between the surfaces so the ring can rotate with respect to both the surfaces during vibrational displacement of the rotor surface, said ring having inner and outer convex surfaces.

* * * * *